United States Patent
Suzuki et al.

(10) Patent No.: US 12,480,448 B2
(45) Date of Patent: Nov. 25, 2025

(54) METHOD FOR STARTING GAS TURBINE

(71) Applicant: MITSUBISHI HEAVY INDUSTRIES, LTD., Tokyo (JP)

(72) Inventors: Kentaro Suzuki, Tokyo (JP); Daiki Yaguchi, Tokyo (JP); Hidetaka Okui, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/082,771

(22) Filed: Mar. 18, 2025

(65) Prior Publication Data

US 2025/0320834 A1 Oct. 16, 2025

(30) Foreign Application Priority Data

Apr. 16, 2024 (JP) ................. 2024-065919

(51) Int. Cl.
*F02C 7/26* (2006.01)
*F01D 19/00* (2006.01)
(Continued)

(52) U.S. Cl.
CPC ............... *F02C 7/26* (2013.01); *F01D 19/00* (2013.01); *F02C 6/08* (2013.01); *F02C 9/18* (2013.01);
(Continued)

(58) Field of Classification Search
CPC ...... F02C 7/26; F02C 9/18; F02C 9/20; F02C 9/22; F02C 9/26; F02C 9/263; F02C 9/28; F02C 9/48; F02C 9/50; F02C 9/52; F02C 9/54; F02C 6/08; F01D 19/00; F01D 19/02; F05D 2260/85; F05D 2270/303; F05D 2270/304
See application file for complete search history.

(56) References Cited

U.S. PATENT DOCUMENTS 5,281,087 A * 1/1994 Hines ............... F04D 29/563
  415/160
6,328,526 B1  12/2001 Seki et al.
(Continued)

FOREIGN PATENT DOCUMENTS

| JP | 2000-291449 | 10/2000 |
| JP | 2004-60544 | 2/2004 |
| JP | 2022-30038 | 2/2022 |

*Primary Examiner* — William H Rodriguez
(74) *Attorney, Agent, or Firm* — Wenderoth, Lind & Ponack, L.L.P.

(57) ABSTRACT

Based on a state of the gas turbine, either a normal start mode or a hot start mode is selected as a start mode. When startup control is started based on the start mode, the rotational speed of the gas turbine gradually increases. In a low rotational speed region, an opening degree of the inlet guide vane provided by a compressor is maintained at a first opening degree and a bleed valve is maintained at second opening degree. In a high rotational speed region, the inlet guide vane is controlled at first intermediate opening degree greater than the first opening degree and the bleed valve is controlled at a second intermediate opening degree less than the second opening degree. The first intermediate opening degree is set to be larger in the hot start mode. The second intermediate opening degree is set to be larger in the hot start mode.

7 Claims, 4 Drawing Sheets

(51) Int. Cl.
   *F02C 6/08*   (2006.01)
   *F02C 9/18*   (2006.01)
   *F02C 9/22*   (2006.01)

(52) U.S. Cl.
   CPC ............ *F02C 9/22* (2013.01); *F05D 2260/85* (2013.01); *F05D 2270/303* (2013.01); *F05D 2270/304* (2013.01)

(56) References Cited

U.S. PATENT DOCUMENTS

| | | | |
|---|---|---|---|
| 10,858,996 B2 * | 12/2020 | Okui | F02C 7/18 |
| 12,196,141 B2 * | 1/2025 | Reynolds | F02C 9/20 |
| 2023/0399987 A1 * | 12/2023 | Hatta | F02C 9/28 |
| 2024/0352896 A1 * | 10/2024 | Reynolds | F04D 27/0261 |

\* cited by examiner

METHOD FOR STARTING GAS TURBINE

CROSS-REFERENCE TO RELATED APPLICATIONS

This application claims the benefit of priority to Japanese Patent Application Number 2024-065919 filed on Apr. 16, 2024. The entire contents of the above-identified application are hereby incorporated by reference.

TECHNICAL FIELD

The disclosure relates to a method for starting a gas turbine.

RELATED ART

In a gas turbine, combustion gas produced by mixed combustion of fuel supplied from fuel supply system with combustion air is used to drive a turbine. The combustion air used to generate the combustion gas is produced by a compressor of the gas turbine. In particular, an inlet guide vane (IGV) is provided at the inlet of the compressor to vary the intake air flow volume by adjusting the opening degree, and a bleed valve is provided downstream of the inlet guide vane to extract to the outside a part of the compressed air produced by the compressor.

As a technology related to the method for starting this type of gas turbine, for example, JP 2000-291449 A is known. In JP 2000-291449 A, when the gas turbine in a stopped state is driven by the startup motor, the inlet guide vane is set to a predetermined opening degree and the bleed valve is set to a relatively large opening degree, so that most of the compressed air is released to the outside as bleed when the rotational speed is low at the initial stage of startup. Then, when the rotational speed increases sufficiently, the opening degree of the bleed valve is reduced to be fully closed, causing shift to a steady operation. In JP 2000-291449 A, the bleed valve can not only open and close but also continuously adjust its opening degree. Thus, when the rotational speed is low at the initial stage of startup, the bleed valve is set to a predetermined intermediate opening degree, thereby reducing the amount of compressed air that is wastefully discharged to the outside as bleed during starting compared with when the bleed valve is set to the fully open state, which improves gas turbine efficiency and avoids a fluid instability phenomenon during starting.

Here, there is a difference in heat capacity between the rotary member and the stationary member, which constitute the compressor. Typically, since the heat capacity of the rotary member is larger than that of the stationary member, the rotary member is harder to cool than that of the stationary member after the gas turbine stops. Thus, when the gas turbine is restarted from a hot state in which the elapsed time from the last stop is relatively short, the rotary member is in a state of thermal expansion as compared to the stationary member, and the clearance between the rotary member and the stationary member is narrowed, so that contact may occur. Thus, normally, the starting prohibition time is set until this state is relieved, or measures are taken to increase the set clearance in the first place. However, the former limits the use of the gas turbine, and the latter reduces the efficiency.

JP 2022-30038 A addresses these issues by temporarily increasing the opening of the inlet guide vane when the gas turbine is started, thereby increasing the intake air flow volume and pressure ratio in the compressor. As a result, the temperature of the compressed air passing through the flow path of the compressor increases, and the cooling of the stationary components and the rotary components of the compressor, which are arranged adjacent to the flow path, is relieved, thereby promoting heating during starting. As a result, the clearance between the stationary component and the rotary component is easily returned to an appropriate value, and contact between the stationary component and the rotary component can be reduced.

SUMMARY

In JP 2022-30038 A, the opening degree of the inlet guide vane is temporarily controlled so as to increase in order to avoid contact between the stationary member and the rotary member during starting. Such a temporary increase in the opening degree of the inlet guide vane is performed at a stage when the rotational speed reaches a relatively high range in a startup sequence in which the rotational speed of the gas turbine gradually increases. In this rotational speed range, the opening degree of the bleed valve is controlled to be small, so that when the opening degree of the inlet guide vane is increased as described in JP 2022-30038 A, the load at the front stage of the compressor increases, thereby the aerodynamics becomes unstable, and surging may occur.

At least one embodiment of the disclosure has been made in consideration of the above-mentioned circumstances, and an object of the disclosure is to provide a method for starting a gas turbine capable of suitably preventing surging in the compressor while reducing the occurrence of contact between the stationary member and the rotary member during starting.

A method for starting a gas turbine according to at least one embodiment of the disclosure includes, in order to solve the above problem, selecting either a normal start mode or a hot start mode, as a start mode, based on a state of a gas turbine;
increasing gradually a rotational speed of the gas turbine by starting a startup control based on the start mode;
maintaining, in a low rotational speed region with the rotational speed of the gas turbine less than a first rotational speed,
an opening degree of an inlet guide vane provided in a compressor of the gas turbine at a first opening degree, and
an opening degree of a bleed valve provided downstream of the inlet guide vane in the compressor at a second opening degree; and
controlling, in a high rotational speed region with the rotational speed including a second rotational speed higher than the first rotational speed,
the opening degree of the inlet guide vane to a first intermediate opening degree greater than the first opening degree, and
the opening degree of the bleed valve to a second intermediate opening degree less than the second opening degree, in which
the first intermediate opening degree when the hot start mode is selected as the start mode is set greater than the first intermediate opening degree when the normal start mode is selected as the start mode; and
the second intermediate opening degree when the hot start mode is selected as the start mode is set greater than the second intermediate opening degree when the normal start mode is selected as the start mode.

According to at least one embodiment of the disclosure, it is possible to provide a method for starting a gas turbine capable of suitably preventing surging in the compressor while reducing the occurrence of contact between the stationary member and the rotary member during starting.

BRIEF DESCRIPTION OF DRAWINGS

The disclosure will be described with reference to the accompanying drawings, wherein like numbers reference like elements.

DESCRIPTION OF EMBODIMENTS

Figure 1:
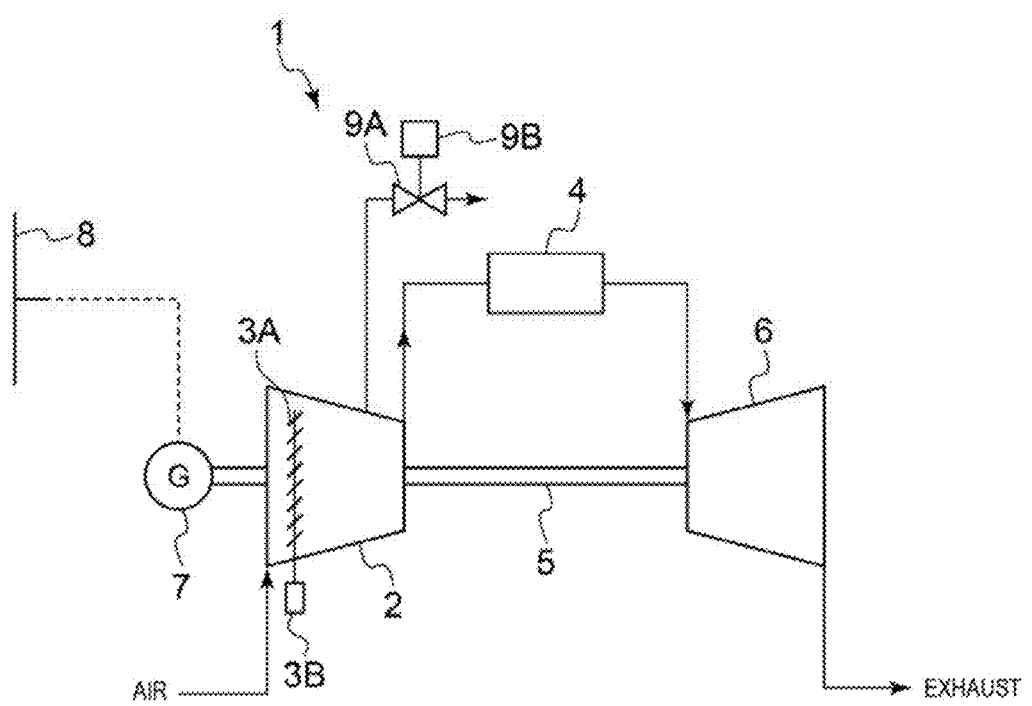
FIG. 1 is a schematic diagram illustrating a schematic configuration of a gas turbine according to one embodiment.

Hereinafter, some embodiments of the disclosure will be described with reference to the accompanying drawings. However, the dimensions, materials, shapes, relative arrangements, or the like of the configurations described as embodiments or illustrated in the drawings are not intended to limit the scope of the disclosure, but are merely illustrative examples.

First, with reference to FIG. 1, the overall configuration of a gas turbine 1, to which the method for starting a gas turbine according to at least one embodiment of the disclosure is applied, will be described. FIG. 1 is a schematic diagram illustrating the schematic configuration of the gas turbine 1 according to one embodiment.

The gas turbine 1 includes a compressor 2 for generating compressed air as combustion air, a combustor 4 for generating combustion gas by mixing and burning fuel with combustion air, and a turbine 6 which has a rotor shaft 5 common to the compressor 2 and can be driven by combustion gas generated by the combustor 4. A generator 7 is coupled to the rotor shaft 5 and can generate electricity by driving the generator 7 by the output of the turbine 6. The generator 7 is electrically connected to a power grid 8 and can supply power generated by the generator 7 to the power grid 8.

An inlet guide vane 3A (IGV: Inlet Guide Vane) is provided at the inlet of the compressor 2 to adjust the air-intake. The opening degree of the inlet guide vane 3A can be adjusted by an actuator 3B. A bleed valve 9A is provided downstream of the inlet guide vane 3A in the compressor 2 so that a part of the compressed air generated by the compressor 2 can be extracted. The opening degree of the bleed valve 9A can be adjusted by an actuator 9B.

Figure 2:
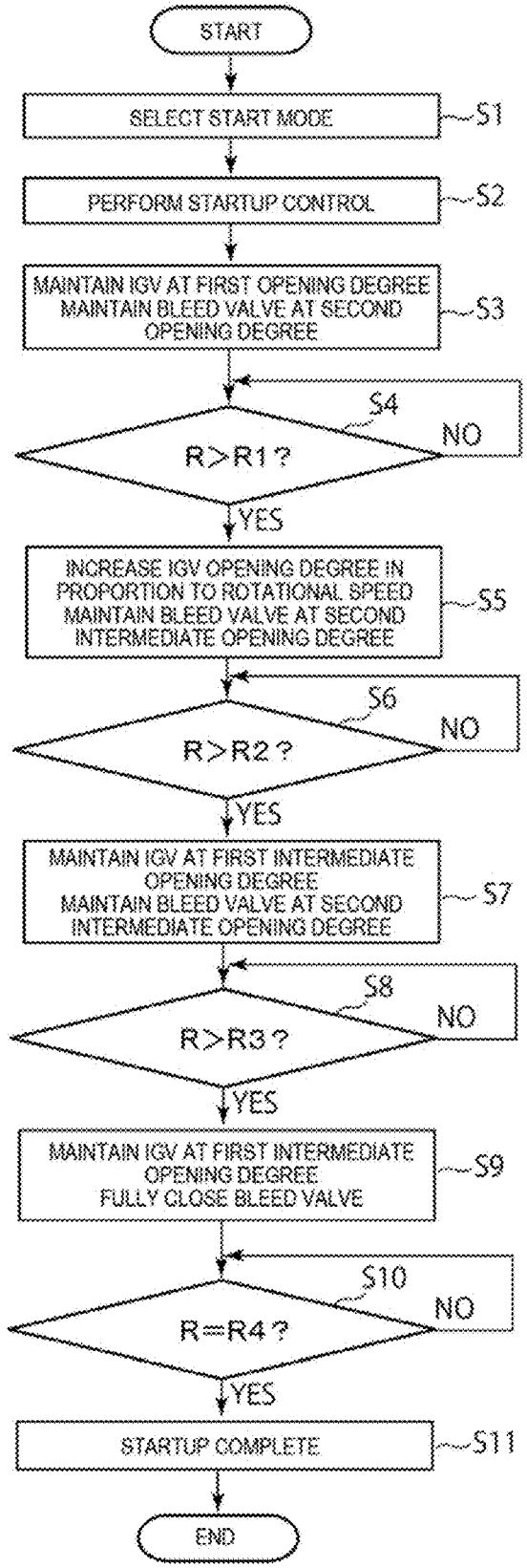
FIG. 2 is a flowchart illustrating a method for starting the gas turbine of FIG. 1.
Figure 3:
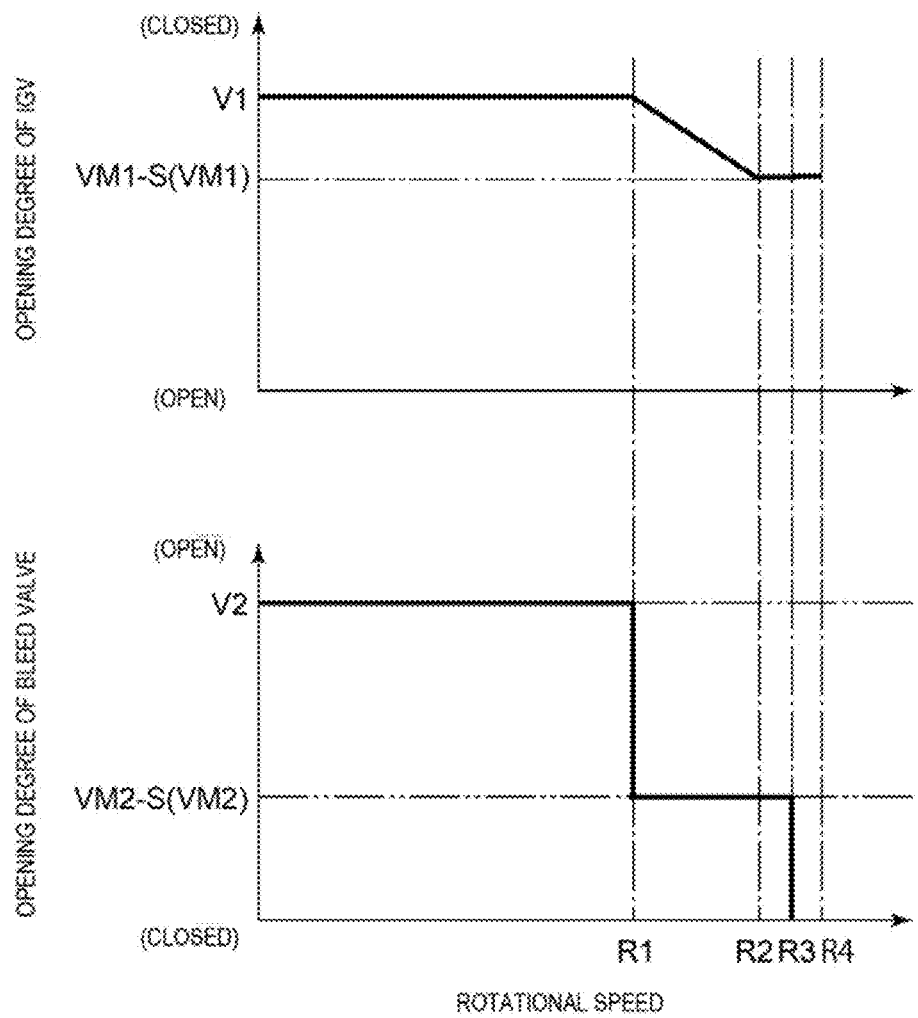
FIG. 3 is a time chart illustrating a change in the opening degree of the inlet guide vane and the bleed valve with respect to the rotational speed when a normal start mode is selected in step S1 of FIG. 2.
Figure 4:
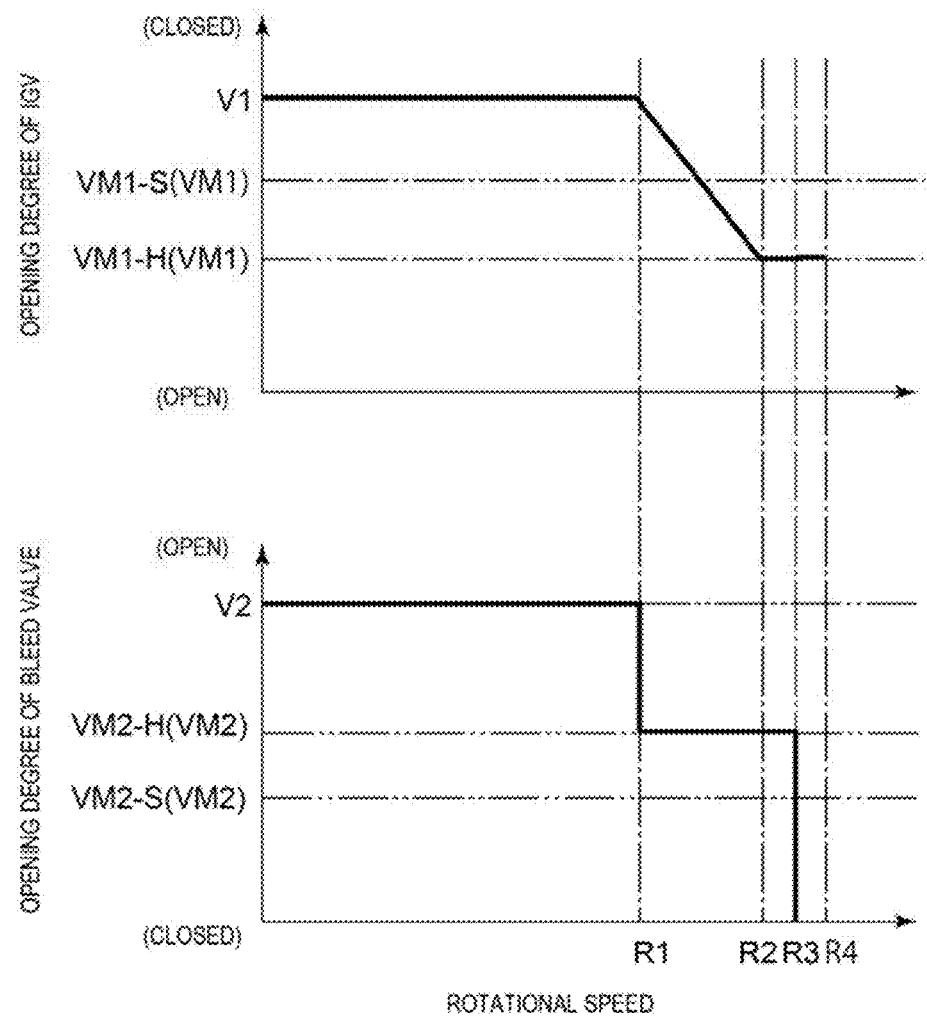
FIG. 4 is a time chart illustrating a change in the opening degree of the inlet guide vane and the bleed valve with respect to the rotational speed when a hot start mode is selected in step S1 of FIG. 2.

Next, a method for starting the gas turbine 1 having the above configuration will be described. FIG. 2 is a flowchart illustrating a method for starting the gas turbine 1 of FIG. 1. FIG. 3 is a time chart illustrating a change in the opening degree of the inlet guide vane 3A and the bleed valve 9A with respect to the rotational speed when a normal start mode is selected in step S1 of FIG. 2. FIG. 4 is a time chart illustrating a change in the opening degree of the inlet guide vane 3A and the bleed valve 9A with respect to the rotational speed when a hot start mode is selected in step S1 of FIG. 2.

First, when the start switch of the gas turbine 1 is turned ON, a start mode is selected based on the state of the gas turbine 1 (step S1). In step S1, either a normal start mode for starting the gas turbine 1 stopped in a cold state or a hot start mode for starting the gas turbine 1 stopped in a state where at least part of the gas turbine 1 is warmer (hot state) than the cold state, can be selected as a start mode.

Such a start mode can be selected based on the state of the gas turbine 1. Specifically, the start mode can be selected based on whether or not at least some of the components of the gas turbine 1 are heated. In this case, the component of the gas turbine 1 that is a target for judgment of whether or not the gas turbine 1 is heated may be a component on the rotary side of the compressor 2 of the gas turbine 1 (e.g., a rotor) or a component on the stationary side (e.g., a compressor casing surrounding the rotor). The temperatures of these components may be measured directly or may be estimated values calculated based on various parameters related to the operating state of the gas turbine 1 (e.g., the casing temperature and cavity temperature of the compressor 2). When the start mode is selected, these temperatures are compared with a predetermined threshold value. When the temperature is less than the threshold value, the normal start mode is selected as the start mode, and when the temperature is not less than the threshold value, the hot start mode is selected as the start mode.

In another embodiment, whether or not at least some of the components of the gas turbine 1 are heated may be determined based on the elapsed time since the last stop of the gas turbine 1. In this case, although the temperatures of at least some of the components of the compressor 2 cannot be directly measured, it is possible to simply evaluate whether or not at least some of the components of the compressor 2 are heated based on the elapsed time since the last stop. The elapsed time since the last stop is measured, for example, by a timer, and the measurement result is compared with a predetermined threshold value, thereby providing a criterion for selecting the start mode. That is, when the elapsed time is not less than the threshold value, the normal start mode is selected as the start mode, and when the elapsed time is less than the threshold value, the hot start mode is selected as the start mode.

The gas turbine 1 then performs startup control according to the start mode selected in step S1 (step S2). When the startup control is performed, a rotational speed R of the gas turbine 1 is controlled so as to gradually increase with the elapsed time.

At the initial stage where the rotational speed R is relatively low when the startup control is started (low rotational speed region), the opening of the inlet guide vane 3A is maintained at a relatively small first opening degree V1, and the opening of the bleed valve 9A is maintained at a relatively large second opening degree V2 (step S3). When the gas turbine 1 in the stopped state is started, startup control is started due to a torque applied by driving the generator 7 as an electric motor, and then, when the rotational speed R becomes high to a certain extent, the startup control shifts to a turbine drive using combustion gas generated by the combustion by the combustor 4. In the low rotational speed region where the rotational speed R is relatively low, by maintaining the opening of the bleed valve 9A at a relatively large second opening degree V2, it is possible to suitably avoid the fluid instability phenomenon that is likely to occur in the compressor 2 when the rotational speed is low at the initial stage of startup.

As illustrated in FIGS. 3 and 4, in the low rotational speed region, the first opening degree V1 where, in the low rotational speed region, the opening degree of the inlet guide vane 3A is maintained, and the second opening degree V2 where the opening of the bleed valve 9A is maintained, are set as common target values for both the normal start mode and the hot start mode.

The first opening degree V1 of the inlet guide vane 3A in step S3 may be 0% (fully closed state). The second opening degree V2 of the bleed valve 9A in step S3 may be 100% (fully open state). Such opening degree control of the inlet guide vane 3A and the bleed valve 9A can be achieved by transmitting control signals to the actuator 3B corresponding to the inlet guide vane 3A and the actuator 9B corresponding to the bleed valve 9A, respectively.

When the rotational speed R further increases and becomes larger than a first rotational speed R1 (step S4: YES), the opening degree of the inlet guide vane 3A monotonically increases in proportion to the rotational speed R, and the bleed valve 9A is maintained at a second intermediate opening degree VM2 (step S5). The second intermediate opening degree VM2 is an intermediate opening degree between the fully closed state (0%) and the fully open state (100%). In the high rotational speed region where the rotational speed R becomes larger than the first rotational speed R1, the opening degree of the inlet guide vane 3A is increased, which raises the intake air flow volume and pressure ratio in the compressor 2, so that the temperature of the compressed air passing through the flow path from the compressor 2 to the combustor 4 is increased, thereby promoting heating during starting. Thus, the occurrence of contact between the stationary member and the rotary member during restarting is suitably reduced.

The first rotational speed R1 is, for example, 65% to 75% of the rated rotational speed.

When the rotational speed R further increases and becomes larger than a second rotational speed R2 (step S6: YES), the opening degree of the inlet guide vane 3A is maintained at a first intermediate opening degree VM1 (step S7). The first intermediate opening degree VM1 is an intermediate opening degree between the fully closed state (0%) and the fully open state (opening degree is 100%). At this time, the opening degree of the bleed valve 9A is maintained at the second intermediate opening degree VM2 as in step S5.

The second rotational speed R2 is, for example, 85% to 95% of the rated rotational speed.

When the rotational speed R increases further and becomes larger than the third rotational speed R3 (step S8: YES), the opening degree of the inlet guide vane 3A is maintained at the first intermediate opening degree VM1 as in step S7, while the opening degree of the bleed valve 9A is controlled at the fully closed state (opening degree is 0%) (step S9). When the rotational speed R reaches a fourth rotational speed R4 (rated rotational speed) (step S10: YES), a series of startup control is completed (step S11). Thus, the gas turbine 1 is brought into the no-load rated speed operation state, and then the generator 7 is connected to the power grid 8.

In the high rotational speed region in which the rotational speed R is higher than the first rotational speed R1 in the series of startup control described above, as can be seen by comparing FIGS. 3 and 4, in the hot start mode, the values of the first intermediate opening degree VM1 and the second intermediate opening degree VM2 are set to be respectively larger than those in the normal start mode. Specifically, the first intermediate opening degree VM1-H in the hot start mode is set to be larger than the first intermediate opening degree VM1-S in the normal start mode, so that the intake air flow volume and pressure ratio in the compressor 2 are increased higher, and the occurrence of contact between the stationary member and the rotary member during starting is more suitably prevented. On the other hand, the second intermediate opening degree VM2-H in the hot start mode is set to be larger than the second intermediate opening degree VM2-S in the normal start mode, so that the load at the front stage of the compressor 2 is decreased, and the occurrence of surging can be suitably reduced.

As described above, according to the above embodiments, it is possible to provide a method for starting a gas turbine capable of suitably preventing surging in the compressor 2 while reducing the occurrence of contact between the stationary member and the rotary member during starting.

The contents described in the above embodiments are understood, for example, as follows.

(1) A method for starting a gas turbine according to one aspect, includes:
  selecting either a normal start mode or a hot start mode, as a start mode, based on a state of a gas turbine;
  increasing gradually a rotational speed of the gas turbine by starting a startup control based on the start mode;
  maintaining, in a low rotational speed region with the rotational speed of the gas turbine less than a first rotational speed,
  an opening degree of an inlet guide vane provided in a compressor of the gas turbine at a first opening degree, and
  an opening degree of a bleed valve provided downstream of the inlet guide vane in the compressor at a second opening degree; and
  controlling, in a high rotational speed region with the rotational speed including a second rotational speed higher than the first rotational speed,
  the opening degree of the inlet guide vane to a first intermediate opening degree greater than the first opening degree, and
  the opening degree of the bleed valve to a second intermediate opening degree less than the second opening degree, in which
  the first intermediate opening degree when the hot start mode is selected as the start mode is set greater than the first intermediate opening degree when the normal start mode is selected as the start mode; and
  the second intermediate opening degree when the hot start mode is selected as the start mode is set greater than the second intermediate opening degree when the normal start mode is selected as the start mode.

According to aspect (1) described above, when the rotational speed is in the low rotational speed region during starting of the gas turbine in which the rotational speed gradually increases according to the start mode, the opening of the inlet guide vane is maintained at a relatively small first opening degree and the opening of the bleed valve is maintained at a relatively large second opening degree. This enables suitably avoiding the fluid instability phenomenon that is likely to occur in the compressor when the rotational speed is low at the initial stage of startup. Then, when the rotational speed reaches the high rotational speed region, the opening of the inlet guide vane is increased to the first intermediate opening degree to increase the intake air flow volume and pressure ratio in the compressor, thereby increasing the temperature of the compressed air passing through the flow path from the compressor to the combustor, which promotes heating during starting. This can suitably prevent the occurrence of contact between the stationary member and the rotary member at the restart of the gas turbine.

As the start mode performed during starting of the gas turbine, either a normal start mode or a hot start mode can be selected based on the state of the gas turbine. In the hot start mode, the values of the first intermediate opening degree and the second intermediate opening degree are set to be larger than those in the normal start mode, respectively. Specifically, in the hot start mode, the occurrence of contact between the stationary member and the rotary member at the restart of the gas turbine can be suitably reduced by increasing the opening degree of the inlet guide vane in the high rotational speed region more than that in the normal start mode. At this time, in the hot start mode, the opening degree of the bleed valve is increased more than that in the normal start mode, thereby preventing the load at the front stage of the compressor and suitably reducing the occurrence of surging.

(2) In another aspect, in above aspect (1),
the opening degree of the inlet guide vane is controlled such that the opening degree increases monotonically with respect to the rotational speed, while the rotational speed increases from the first rotational speed to the second rotational speed.

According to above aspect (2), when the rotational speed of the gas turbine which gradually increases during starting is in the range from the first rotational speed to the second rotational speed, the opening of the inlet guide vane is controlled so as to increase monotonically with respect to the rotational speed.

(3) In another aspect, in above aspect (1) or (2),
the opening degree of the bleed valve is maintained at the second intermediate opening degree while the rotational speed increases from the first rotational speed to the second rotational speed.

According to the aspect (3), when the rotational speed of the gas turbine which gradually increases during starting is in the range from the first rotational speed to the second rotational speed, the opening of the bleed valve is maintained at the second intermediate opening degree regardless of the rotational speed.

(4) In another aspect, in any one of aspects (1) to (3),
the state of the gas turbine is determined based on at least one of a casing temperature of the compressor or a temperature of a cavity communicating with a flow path of compressed air generated by the compressor.

According to above aspect (4), the state of the gas turbine used for selecting the start mode is determined based on at least one of the casing temperature or the cavity temperature of the compressor. The casing temperature or the cavity temperature of the compressor is suitable as an index for determining whether or not the gas turbine before starting is in a hot state.

(5) In another aspect, in any one of above aspects (1) to (3),
the state of the gas turbine is determined based on elapsed time since the last stop of the gas turbine.

According to above aspect (5), the state of the gas turbine used for selecting the start mode can be easily determined based on the elapsed time since the last stop of the gas turbine.

(6) In another aspect, in any one of above aspects (1) to (5),
the first rotational speed is 65% to 75% of the rated rotational speed of the gas turbine.

According to above aspect (6), by setting the first rotational speed within the range of 65% to 75% of the rated rotational speed, it is possible to suitably avoid the fluid instability phenomenon that is likely to occur in the compressor when the rotational speed is low at the initial stage of startup in the low rotational speed region where the first rotational speed is the upper limit rotational speed.

(7) In another aspect, in any one of above aspects (1) to (6),
the second rotational speed is 85% to 95% of the rated rotational speed of the gas turbine.

According to above aspect (7), by setting the second rotational speed within the range of 85% to 95% of the rated rotational speed, it is possible to suitably prevent the occurrence of contact between the stationary member and the rotary member during starting in the high rotational speed region including the second rotational speed.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A method for starting a gas turbine, comprising:
selecting either a normal start mode or a hot start mode, as a start mode, based on a state of a gas turbine;
increasing gradually a rotational speed of the gas turbine by starting a startup control based on the start mode;
maintaining, in a low rotational speed region with the rotational speed of the gas turbine less than a first rotational speed,
an opening degree of an inlet guide vane provided in a compressor of the gas turbine at a first opening degree, and
an opening degree of a bleed valve provided downstream of the inlet guide vane in the compressor at a second opening degree; and
controlling, in a high rotational speed region with the rotational speed including a second rotational speed higher than the first rotational speed,
the opening degree of the inlet guide vane to a first intermediate opening degree greater than the first opening degree, and
the opening degree of the bleed valve to a second intermediate opening degree less than the second opening degree, wherein
the first intermediate opening degree when the hot start mode is selected as the start mode is set greater than the first intermediate opening degree when the normal start mode is selected as the start mode, and
the second intermediate opening degree when the hot start mode is selected as the start mode is set greater than the second intermediate opening degree when the normal start mode is selected as the start mode.

2. The method for starting a gas turbine, according to claim 1, wherein
the opening degree of the inlet guide vane is controlled such that the opening degree increases monotonically with respect to the rotational speed while the rotational speed increases from the first rotational speed to the second rotational speed.

3. The method for starting a gas turbine, according to claim 1, wherein
the opening degree of the bleed valve is maintained at the second intermediate opening degree while the rotational speed increases from the first rotational speed to the second rotational speed.

4. The method for starting a gas turbine, according to claim 1, wherein
the state of the gas turbine is determined based on at least one of a casing temperature of the compressor or a temperature of a cavity communicating with a flow path of compressed air generated by the compressor.

5. The method for starting a gas turbine, according to claim 1, wherein
the state of the gas turbine is determined based on elapsed time since last stop of the gas turbine.

6. The method for starting a gas turbine, according to claim 1, wherein
the first rotational speed is 65% to 75% of a rated rotational speed of the gas turbine.

7. The method for starting a gas turbine, according to claim 1, wherein
the second rotational speed is 85% to 95% of a rated rotational speed of the gas turbine.

* * * * *